United States Patent
Hisai et al.

(10) Patent No.: US 11,054,013 B1
(45) Date of Patent: Jul. 6, 2021

(54) PROFILE MODIFICATION FOR PLANETARY GEAR DEVICE GEAR TEETH

(71) Applicant: Enplas Corporation, Kawaguchi (JP)

(72) Inventors: Koki Hisai, Kawaguchi (JP); Kazuki Yamada, Kawaguchi (JP)

(73) Assignee: Enplas Corporation, Kawaguchi (JP)

( * ) Notice: Subject to any disclaimer, the term of this patent is extended or adjusted under 35 U.S.C. 154(b) by 0 days.

(21) Appl. No.: 17/144,288

(22) Filed: Jan. 8, 2021

(51) Int. Cl.
F16H 55/08 (2006.01)
F16H 1/28 (2006.01)
F16H 57/00 (2012.01)
F16H 55/17 (2006.01)
F16H 57/02 (2012.01)

(52) U.S. Cl.
CPC ............. *F16H 55/088* (2013.01); *F16H 1/28* (2013.01); *F16H 55/0886* (2013.01); *F16H 55/17* (2013.01); *F16H 57/0006* (2013.01); *F16H 57/02* (2013.01); *F16H 2055/0893* (2013.01)

(58) Field of Classification Search
None
See application file for complete search history.

(56) References Cited

U.S. PATENT DOCUMENTS

| | | | | |
|---|---|---|---|---|
| 2,682,760 | A | * 7/1954 | Shenk | F16D 3/185 464/154 |
| 3,881,365 | A | * 5/1975 | Hardy | F16H 55/08 74/462 |
| 5,605,518 | A | * 2/1997 | Kogure | F16H 1/28 475/344 |
| 7,921,745 | B2 | * 4/2011 | Takumori | F16H 55/0886 74/462 |
| 10,584,784 | B2 | * 3/2020 | Ohmi | F16H 55/0806 |
| 10,816,076 | B2 | * 10/2020 | Ohmi | F16H 55/088 |
| 2007/0017314 | A1 | * 1/2007 | Konishi | F16H 55/0886 74/462 |
| 2007/0137355 | A1 | * 6/2007 | Ohmi | F16H 55/0886 74/462 |
| 2018/0291997 | A1 | * 10/2018 | Vail | F16H 55/17 |
| 2020/0182344 | A1 | * 6/2020 | Sato | B61C 9/50 |

FOREIGN PATENT DOCUMENTS

| | | | | |
|---|---|---|---|---|
| EP | 1832370 | A1 | * 9/2007 | B23F 19/10 |
| GB | 741376 | A | * 11/1955 | F16H 55/0886 |

OTHER PUBLICATIONS

EP-1823370 google translation (Year: 2017).*

* cited by examiner

*Primary Examiner* — Dirk Wright
(74) *Attorney, Agent, or Firm* — Sterne, Kessler, Goldstein & Fox P.L.L.C.

(57) ABSTRACT

A gear tooth for a gear of a planetary gear device may include a profile modification that alters a profile of the gear tooth to reduce wear and noise. Aspects of the profile modification may include a planar surface that connects a tip surface of the gear tooth with a first or second side of the gear tooth. Other aspects of the profile modification may include a curved surface connecting a tip surface of the gear tooth with a first or second side of the gear tooth. The gear tooth may also include non-constant profile width as measured between the first side and the second side in a gear thickness direction extending between the top and bottom surfaces of the gear. Aspects of gear teeth with either or both the profile modification and non-constant profile width may reduce tooth wear and gear noise during operation of the planetary gear device.

9 Claims, 8 Drawing Sheets

PROFILE MODIFICATION FOR PLANETARY GEAR DEVICE GEAR TEETH

TECHNICAL FIELD

The present disclosure relates to configurations of gears in a planetary gear device, and specifically to configurations of the gear teeth for gears in a planetary gear device for power back door.

BACKGROUND

Planetary gear devices (also known as epicyclic gear devices) are a type of gearing system used to transform rotational motion in machines. These devices are used in many different applications because they are relatively compact and allow for multiple different gear ratio options for transforming rotational motion. Examples of applications of planetary gear devices include motor vehicles (where the term planetary gear box is often used), heavy vehicles (e.g., tractors and excavation equipment), industrial machines, housing equipment. Planetary gear devices may also be reduced in size and used in conjunction with actuators to operate many different mechanism, including, for example, power back doors (PBD) in vehicles, parking brakes in vehicles, power windows in vehicles, electric shutters or electric blinds for installation and use in vehicles or buildings, such as homes or office buildings.

As discussed in detail below, planetary gear devices include several different gears that mesh with each other and work together to create a gear ratio that transforms input rotational motion to a desired output rotational motion. The different gears are mounted on gear shafts using a shaft hole that is located at the center of each gear. The various gears have gear teeth that mesh together to transmit rotational motion between the gears. When gears mesh together, the teeth make physical contact that results in noise and wear on the gear teeth. Current strategies for reducing gear noise and wear include, for example, gear lubrication and material choice for the gears and gear teeth. Thus, improving gears and gear teeth to mitigate both noise and wear simultaneously has proven difficult in the prior art.

BRIEF SUMMARY

Aspects of the present disclosure include gear tooth for a gear of a planetary gear device. The gear tooth includes a tip surface that is formed at an outer extension of the gear tooth in a radial direction, a first surface that extend from an outer surface of a gear body towards the tip surface, and a second surface that extend from the outer surface of the gear body towards the tip surface. A profile modification extends between the tip surface and at least one of the first surface or the second surface such that the profile modification joins the tip surface and the at least one of the first surface and the second surface.

Further aspects of a gear tooth include a tip surface that is formed at an outer extension of the gear tooth in a radial direction, a first surface that extend from an outer surface of a gear body towards the tip surface, and a second surface that extend from the outer surface of the gear body towards the tip surface. The gear tooth is formed such that a distance measured between the first surface and the second surface is not constant in a width direction extending between an upper surface and a lower surface of the gear body.

BRIEF DESCRIPTION OF THE DRAWINGS/FIGURES

The accompanying drawings, which are incorporated herein and form part of the specification, illustrate aspects of the present disclosure and, together with the description, further serve to explain the principles of the disclosure and to enable a person skilled in the relevant art to make and use the disclosure.

DETAILED DESCRIPTION

Figure 1:
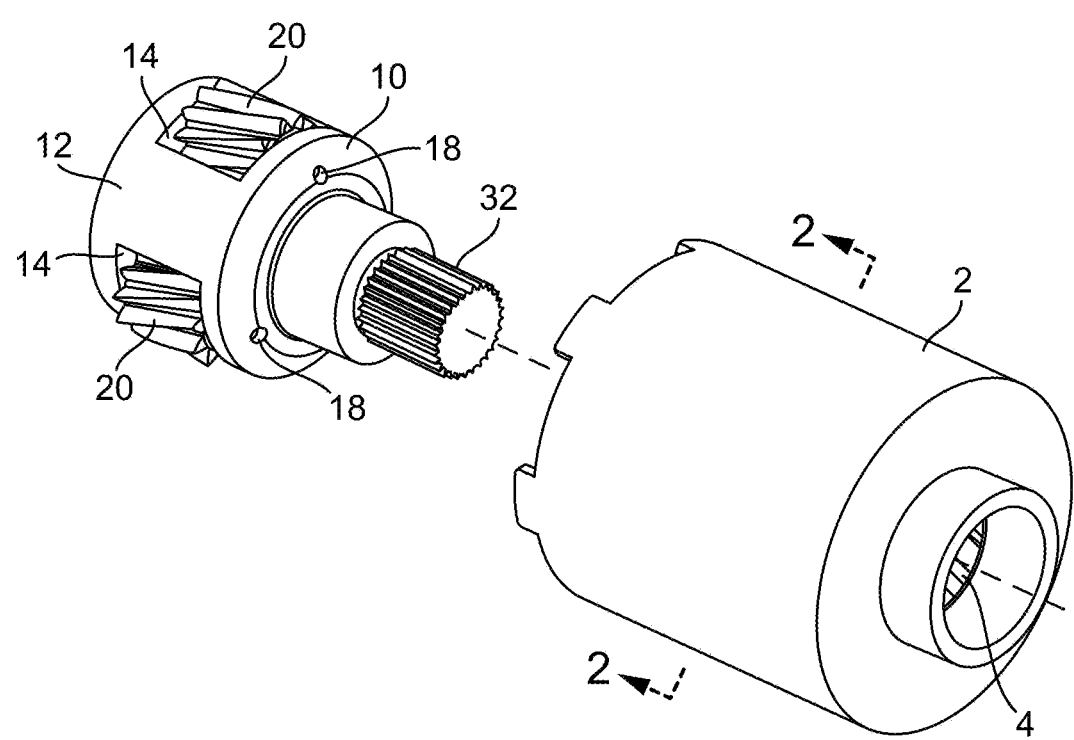
FIG. 1 is a perspective view of a planetary gear device according to aspects of the disclosure.

The present disclosure will now be described in detail with reference to embodiments thereof as illustrated in the accompanying drawings. References to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspect whether or not explicitly described.

The gears of a planetary gear device include teeth that mesh to transmit rotational motion between the gears. This meshing is how the rotational motion is transmitted through the planetary gear device between the input and output portions of the planetary gear device. When two gears mesh there is typically only a single gear tooth from each gear that is in contact at any given instant. These individual gear teeth must transmit all of the forces created by the rotational motion between the gears. As the gears rotate, the gear teeth contact each other repeatedly and begin to exhibit wear from the repeated physical contact. Excessive wear of the gear teeth can eventually lead to gear teeth that are too worn to successfully, which may result in reduced power transmission efficiency and, ultimately, mechanical failure of the planetary gear device. Gear teeth also create noise when they mesh because of the physical contact created by the meshing process. Minimizing planetary gear device noise can be desirable in many instances, particularly when a human operator is positioned near the planetary gear device, as is often the case when planetary gear devices are used in manufacturing machinery or vehicles. Techniques such as special lubrication and material selection for gears can mitigate gear tooth wear and noise, but there is still a need for systems and methods of improving gear tooth wear and reducing tooth noise. Aspects of the present disclosure may yield significant improvements to either or both gear tooth wear and noise, improving on the shapes of gear teeth themselves, without relying only on special lubricants or gear material selection.

An aspect of a gear tooth for a gear of a planetary gear device per the present disclosure includes a tip surface that is formed at an outer extension of the gear tooth in a radial direction, a first surface that extend from an outer surface of a gear body towards the tip surface, and a second surface that extend from the outer surface of the gear body towards the tip surface. A profile modification extends between at least one of the first surface and the second surface and the tip surface such that the profile modification joins the tip surface and the at least one of the first surface and the second surface. As will be discussed below, this system provides advantages that address either or both gear tooth wear and noise.

FIG. 1 shows a partially exploded perspective view of a planetary gear device. A cylindrical housing 2 is shown along with a carrier 10 that has been removed from housing 2. Two planetary gears 20 are visible mounted in carrier 10. Each planetary gear 20 is rotatably mounted in carrier 10. There may be at least one planetary gear 20 mounted in carrier 10. In some aspects there may be two, three, four, or more planetary gears 20 rotatably mounted in carrier 10. Carrier 10 includes openings 14 in outer surface 12. Openings 14 may be designed as gaps in the circumference of outer surface 12 that correspond to the positions of planetary gears 20. Planetary gears 20, in turn, may be mounted such that teeth 23 of planetary gears 20 extend through opening 14 beyond outer surface 12 of carrier 10 in a radial direction.

Figure 2:
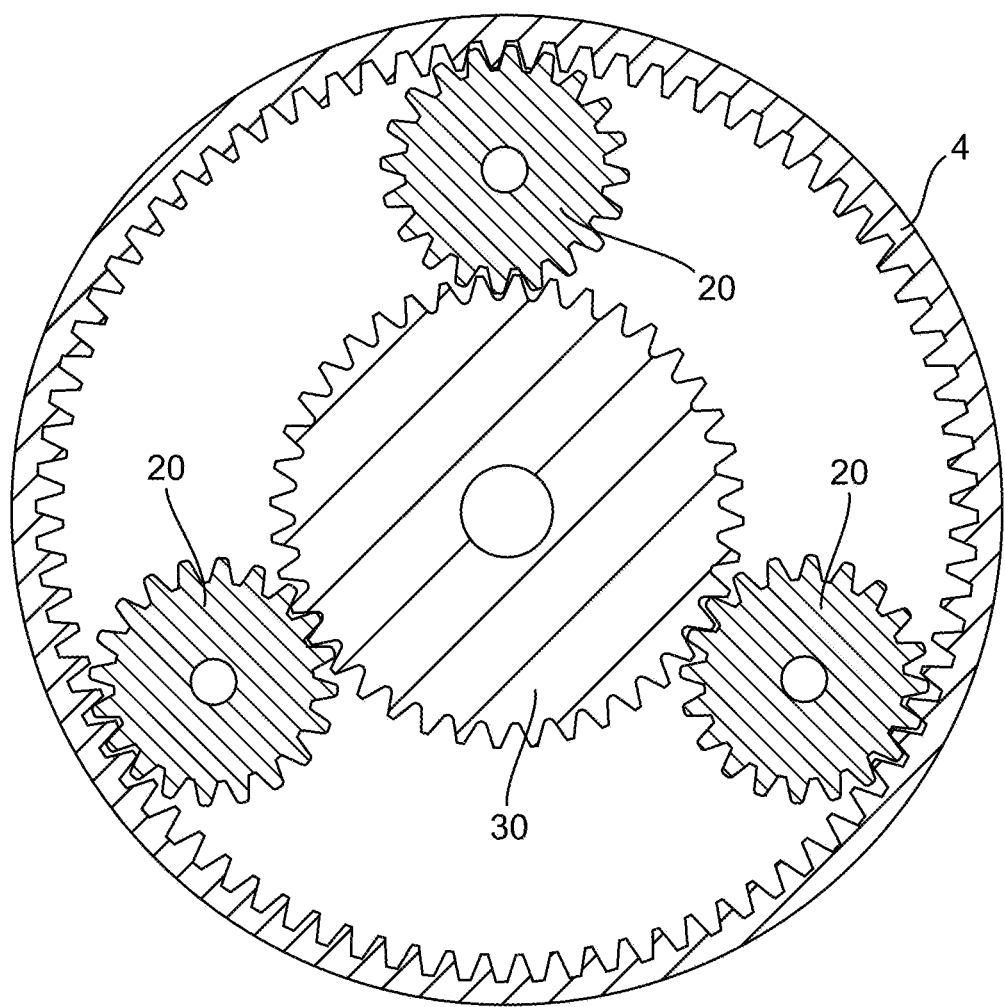
FIG. 2 is a cross section of a planetary gear device as shown in FIG. 1 according to aspects of the disclosure.

Also shown in FIG. 1 is the sun gear shaft 32 of the sun gear 30. As shown in FIG. 2, sun gear 30 is inserted into a sun gear opening in the center of carrier 10 such that the teeth of sun gear 30 mesh with the teeth 23 of planetary gear 20. In the aspect shown in FIG. 1, sun gear shaft 32 extends beyond housing 2 and has teeth configured to transmit rotational motion to or from sun gear shaft 32 (and, thus, sun gear 30).

Figure 4:
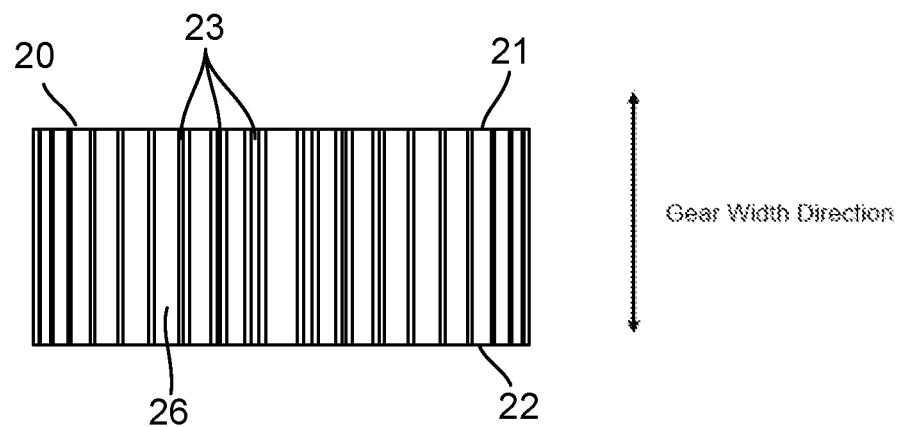
FIG. 4 is a side view of a planetary gear according to aspects of the disclosure.

As shown by the dashed axis line, carrier 10 is inserted into housing 2 such that the axis of carrier 10 and the axis of housing 2 are aligned. As shown in FIG. 4, this aspect of carrier 10 includes a boss 16 that extends from the side of carrier 10 opposite the sun gear opening. Boss 16 is received by a corresponding opening in housing 2 or other supporting structure and allows carrier 10 to rotate within housing 2.

FIG. 2 shows a cross section view of housing 2 when the planetary gear device is fully assembled. This view shows the final gear element of planetary gear device: inner gear 4. In this aspect, internal gear 4 is fixed to the inner wall of housing 2. As shown in FIG. 2, once assembled sun gear 30 located at the center of housing 2 is meshed with planetary gears 20, which are in turn meshed with internal gear 4.

Figure 3:
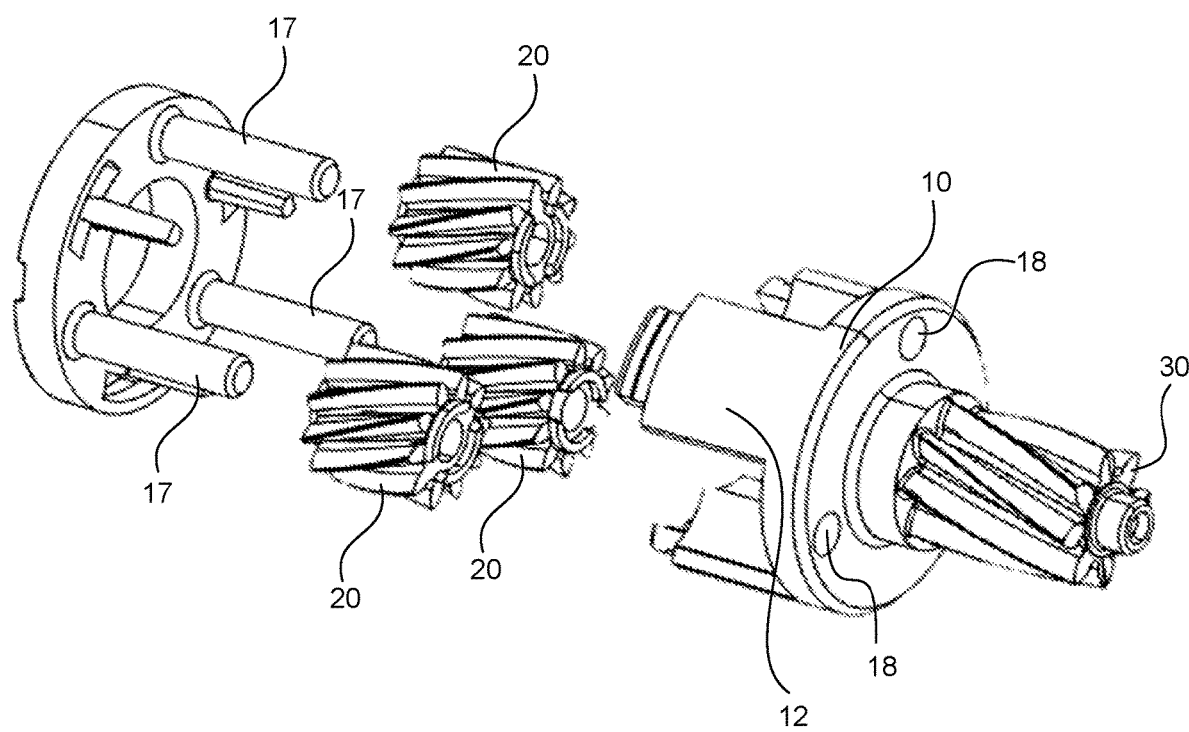
FIG. 3 is an exploded view of a carrier of a planetary gear device according to aspects of the disclosure.

FIG. 3 shows an aspect of carrier 10 that includes two separate portions joined together to form carrier 10. These aspects of carrier 10 may improve assembly efficiency by planetary gears 20 being positioned inside separate portions of carrier 10 before the separate portions are joined together to form carrier 10. In aspects like those shown in FIG. 3, planetary gear shafts 17 may be integrated into a portion of carrier 10, while another portion of carrier 10 may be configured to include corresponding planetary gear shaft holes 18. Planetary gears 20 can be mounted onto planetary gear shafts 17 before joining these corresponding portions of carrier 10, according to some aspects, which may further improve assembly efficiency.

Any of the elements of planetary gear device discussed above may be manufactured from an suitable material. For example, elements may be manufactured from suitable metals or plastics. In some aspects, some or all of the elements discussed above are made from synthetic resins including ultrapolymer polyethylene (UHPE), polyphenylene sulfide (PPS), polyarylate (PAR), polyacetal (POM), or polyamide (PA), polycarbonate (PC), polybutylene terephthalate (PBT), polyether sulfone (PES), polyether ether ketone (PEEK), polyacetal (POM). In any specific aspects, one or more of the elements discussed above may be selected because of its strength and wear characteristics relative to its weight and ease of manufacture.

Applications of aspects of planetary gear device include motor vehicles (where the term planetary gearbox is often used), heavy vehicles (e.g., tractors, construction equipment, and excavation equipment), industrial machines, and household equipment, for example. Some aspects of planetary gear device may also be reduced in size and weight, enabling their use in smaller applications. Compact and lightweight aspects of planetary gear device may be used in conjunction with actuators to operate many different mechanisms in vehicles, including, for example, a power back door (PBD), also known as a power liftgate, power rear hatch, or a power trunk lid; parking brakes or emergency brakes; power windows; and electric shutters or electric blinds for installation and use in vehicles or in buildings (e.g., homes and office buildings).

Planetary gear device as shown in FIGS. 1 and 2 can function in several different ways. For example, providing a rotational input to sun gear 30 and allowing carrier 10 to rotate freely will result in a rotational output being produced housing 2, because internal gear 4 is fixed to housing 2, as shown in the accompanying drawings. The gear ratio that the rotational motion experiences is governed by the number of teeth each gear member has in planetary gear device. Changing which components are free to rotate and which components are the input and output alters the gear ratio and how the rotational motion is transformed by planetary gear device. The lubrication systems and methods discussed below are applicable to any operational method or configuration of planetary gear devices.

Figure 5:
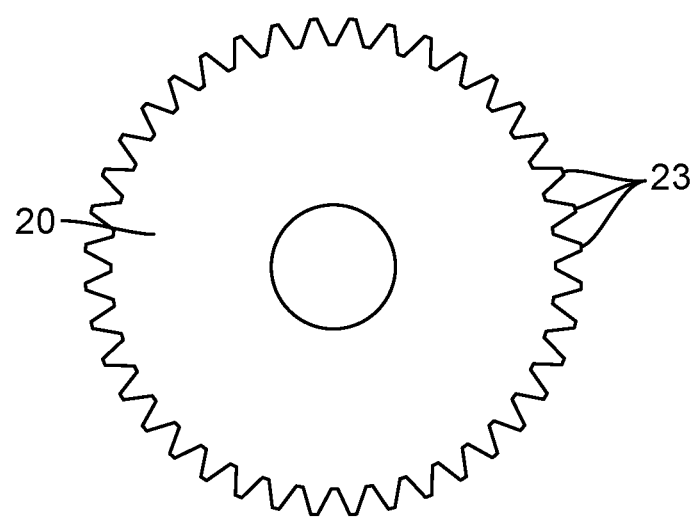
FIG. 5 is a top view of a planetary gear device according to aspects of the disclosure.

FIGS. 4 and 5 are side and top views, respectively of an aspect of planetary gear 20. As shown in FIGS. 4 and 5, planetary gear 20 may be formed as a disc-shaped body with an opening at the radial center. Gear teeth 23 are visible extending in the gear width direction across an outer surface 26 of planetary gear 20 in FIG. 4. As shown in FIG. 4, gear teeth 23 extend radially outwards from planetary gear 20. The aspect of planetary gear 20 shown in FIGS. 4 and 5 is configured as a spur gear where each gear tooth 23 runs parallel to the axis of planetary gear 20. Other aspects of planetary gear 20 may be configured as helical gears, where each gear tooth 23 runs at an angle to the axis of planetary gear 20. In some aspects helical configurations of planetary gear 20 may be preferable. Each gear tooth 23 is formed as a solid extrusion of planetary gear 20 with a gap or space between pairs of gear teeth 23. These gaps or spaces are configured to receive the gear teeth of other gears during gear meshing. The other gears in a planetary gear device (e.g., sun gear 30 and internal gear 4) also have gear teeth in a similar manner as planetary gear 20. As shown in FIG. 2, sun gear 30 is configured similarly to planetary gear 20 in having gear teeth that extend radially outwards from the center of sun gear 30. Internal gear 4 has the reverse orientation and has gear teeth that extend radially inwards because of internal gear 4's position inside housing 2. In both cases, the gear teeth of sun gear 30 and internal gear 2 may be functionally identical to gear teeth 23 of planetary gear 20.

Figure 6:
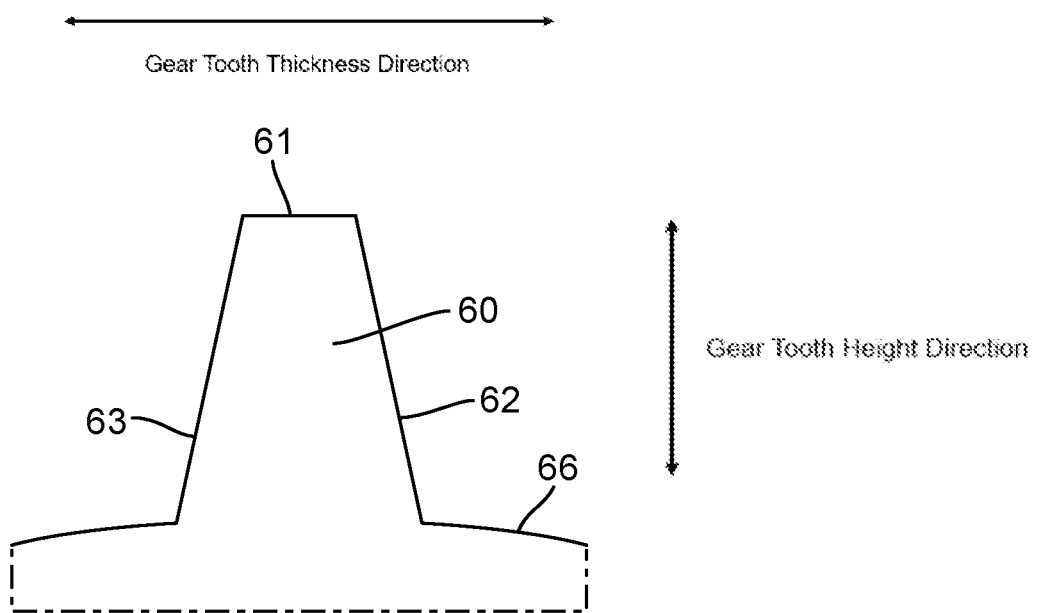
FIG. 6 is a cross section of a gear tooth according to aspects of the disclosure.

FIG. 6 is a side view of a single gear tooth 60. This view illustrates the profile of gear tooth 60. Gear tooth 60 is an example of a standard gear tooth that may be found on any of the gears of planetary gear device as explained below. The aspect of gear tooth 60 shown in FIG. 6 shows that gear tooth 60 is formed as with a trapezoidal shape, having a first side 62 and a second side 63 that extend outwards from a gear surface 66 at an angle to the radial direction. First surface 62 and second surface 63 meet an outer surface or tip surface 61 that forms the end of gear tooth 60. Outer surface 61 is therefore disposed at the outermost radial extent of gear tooth 60. As shown in FIG. 6, first surface 62 and second surface 63 meet outer surface 61 at discreet points that result in obtuse angles being formed between first surface 62 and second surface 63 and outer surface 61. The specific height and thickness of gear tooth 60 may be varied as needed depending on the specifics of the gear and gearing system. As shown in FIG. 6, gear tooth height is measured in a radial direction. Gear tooth thickness is the direction perpendicular to height in FIG. 6. Gear teeth are typically designed with a gear thickness that narrows as radial distance (i.e., height) increases, as shown in FIG. 6. This results in outer surface 61 being the area of narrowest thickness of gear tooth 60. This may be done to improve gear meshing because the tapered profile of gear tooth 60 fits into the resulting gap in the corresponding gear more easily.

The profile of the aspect gear tooth 60 shown in FIG. 6 may remain constant in the gear thickness direction, which in FIG. 6 is the direction that is in and out of the page. This means that thickness and height of gear tooth 60 does not vary as gear tooth 60 extends across gear surface 66.

FIGS. 7-12 illustrate aspects of gear teeth 60 per the present disclosure. These aspects differ from the aspect shown in FIG. 6 in ways that may provide significant advantages regarding gear tooth wear and gear noise.

Figure 7:
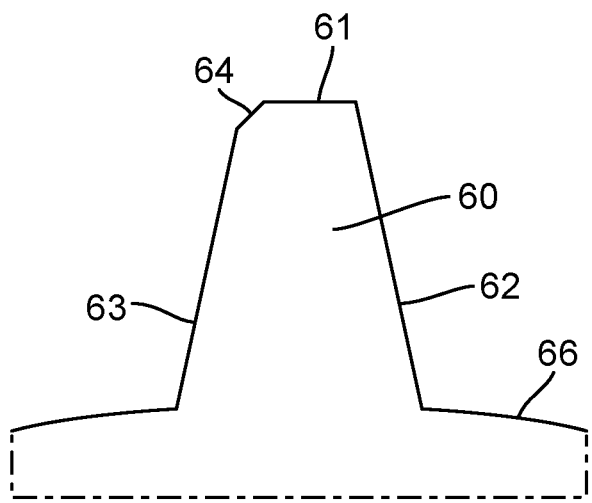
FIG. 7 is a cross section of a gear tooth according to aspects of the disclosure.

FIG. 7 is a side view of an aspect of gear tooth 60 incorporating a profile modification according to the present disclosure. The aspect of gear tooth 60 includes a first side 62 and second side 63 extending from gear surface 66 towards outer surface 61. First side 62 intersects with outer surface 61 in the same manner as discussed above with respect to FIG. 6. However, in gear tooth 60 of FIG. 7 a profile modification 64 is disposed between second side 63 and outer surface 61. Here, profile modification 64 is formed as an additional planar surface that extends between, and links, second side 63 and outer surface 61. This surface is formed at an angle with both second side 63 and outer surface 61, which results in a less abrupt transition between second side 63 and outer surface 61. This smoother transition may create less wear, even for gear materials that are softer or more flexible, and may reduce noise when gear tooth 60 meshes, even for gear materials that are relatively hard or less flexible. The specific length and angle of the planar surface of this aspect of profile modification 64 can be selected based on the operational conditions of the overall system. Generally, increasing the size of this aspect of profile modification 64 can result in a smoother transition between outer surface 61 and second surface 63. However, this increased size may need to be balanced with other considerations, such as structural integrity of gear tooth 60 and meshing capability of gear tooth 60.

Figure 8:
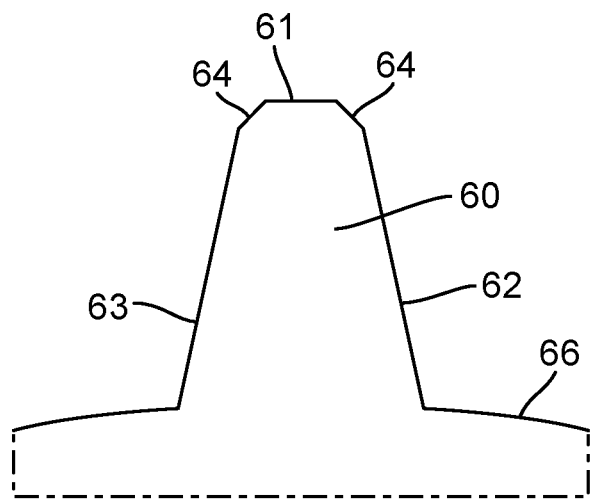
FIG. 8 is a cross section of a gear tooth according to aspects of the disclosure.

The aspect of gear tooth 60 in FIG. 7 shows profile modification 64 extending only on a single side of gear tooth 60. This may be desirable, for example, in gears that only turn in one direction, because then gear tooth 60 will only experience significant loading on a single side, and thus only requires profile modification 64 on the loaded side. However, it is often the case that gears may turn in both directions (e.g., in forward and reverse directions in a gearbox of a vehicle). In these systems, it may be desirable to have profile modifications 64 on both sides of gear tooth 60, as shown in FIG. 8. The aspect of gear tooth 60 shown in FIG. 8 is similar to the aspect of FIG. 7, and includes first side 62 and second side 63 extending from gear surface 66. However, there are two profile modifications 64, comprising planar surfaces linking first side 62 and second side 63 to outer surface 61. These profile modifications 64 may be identical (and, thus, the profile of gear tooth 60 is symmetrical), or they may be different depending on the design requirements. For example, if the loading on gear tooth 60 during operation is not equal in both rotational directions, it may be desirable to have a smaller profile modification 64 on the side of gear tooth 60 that corresponds to the lower operational loading because this side will not experience as much wear caused by physical contact due to the lower loading.

Figure 9:
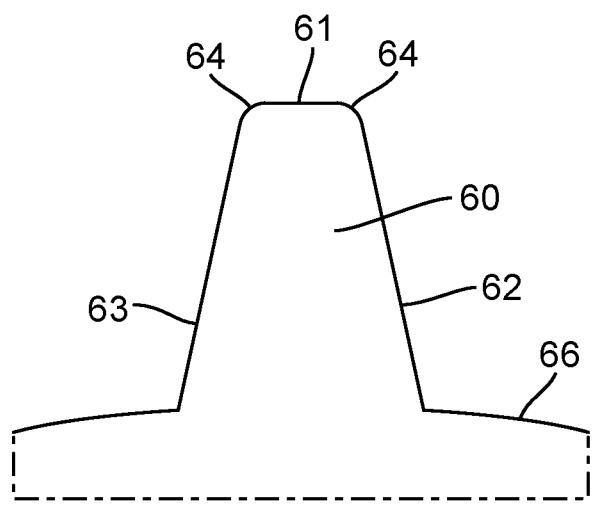
FIG. 9 is a cross section of a gear tooth according to aspects of the disclosure.

FIG. 9 shows another aspect of gear tooth 60 with two profile modifications 64 liking first side 62 and second side 63 to outer surface 61. As shown in FIG. 9, these profile modifications 64 are smooth, curved transitions that substantially remove or eliminate any angular intersections between the sides and outer surface 61. These curved transitions may have a constant radius, or they may have a varying radius of curvature depending on specific operational needs. Furthermore, the size of these of aspects profile modifications 64 may be varied in the same manner as the planar aspects discussed above. These curved aspects of profile modification 64 as shown in FIG. 9 smooth the transition between the sides and outer surface 61 and may result in less wear, even for gear materials that are softer or more flexible, and may reduce gear noise, even for gear materials that are relatively hard or less flexible. As discussed above, although FIG. 9 shows an aspect of gear tooth 60 with two identical curved profile modifications 64, the profile modifications do not need to be identical, and may be varied depending on operational requirements. Furthermore, there may only be one curved profile modification 64 present in combination with a planar profile modification 64 as shown in FIGS. 7 and 8, or curved profile modification 64 may be the only profile modification 64 present on gear tooth 60.

Figure 10:
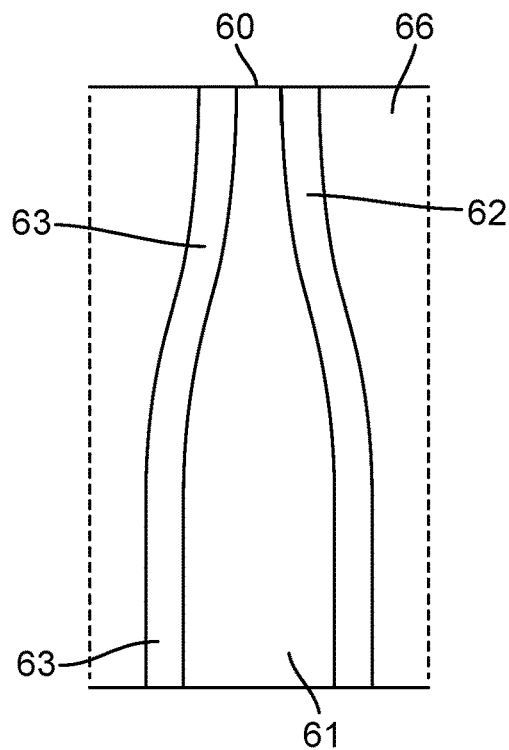
FIG. 10 is a top view of a gear tooth according to aspects of the disclosure.

As discussed above, the profile of aspects of gear tooth 60 may remain constant in the gear thickness direction. However, some aspects of gear tooth 60 may not have a constant profile. For example, FIG. 10 shows a side view of a gear tooth 60 that is a view from the same viewpoint as shown in FIG. 4, but including only a single gear tooth 60 for clarity. This aspect of gear tooth 60 does not have a constant profile. Instead, as shown in FIG. 10, the profile of gear tooth 60 is significantly smaller towards the top of gear tooth 60, and then transitions to a wider profile towards the bottom of gear tooth 60. In the aspect of FIG. 10, the entire profile of gear tooth 60 is narrowed at the top of gear tooth 60, which means that the base of gear tooth 60 (the part closest to gear surface 66) is reduced in proportion with outer surface 61. However, the reduction in profile does not need to be constant. For example, the base of gear tooth 60 may be a constant size, but outer surface 61 may vary in size. This type of variation may be desirable because it results in increased material, and thus structural strength, at the base of gear tooth 60. In other aspects, the base of gear tooth 60 may vary in size at a different rate than the change in size of outer surface 61.

Varying the profile of gear tooth 60 in the gear width direction, and in particular selectively narrowing the profile may result in less gear noise and wear because of the reduction in surface area of gear tooth 60 that is in contact with other gear teeth.

Figure 11:
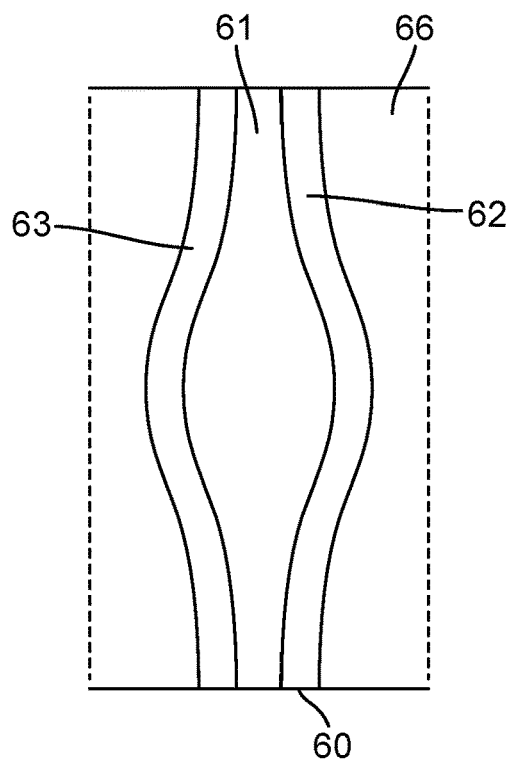
FIG. 11 is a top view of a gear tooth according to aspects of the disclosure.
Figure 12:
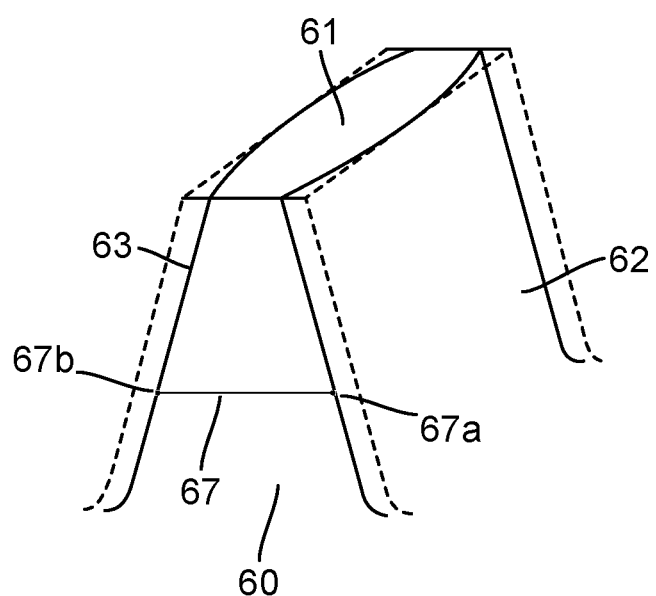
FIG. 12 is a perspective view of a gear tooth according to aspects of the disclosure

The aspect of gear tooth 60 shown in FIG. 11 shows another example of gear tooth 60 with varying profile. In this aspect, both the upper and lower ends of gear tooth 60 are narrower than the middle of gear tooth 60. The profile variation of FIG. 11 is symmetrical, although asymmetrical changes in gear thickness are also possible. For example, aspects of gear tooth 60 may be narrower in the center and wider at the upper and lower ends of gear tooth 60. FIG. 12 is a perspective view of the aspect of gear tooth 60 shown in FIG. 11. Visible in dashed lines is the outline of a standard gear tooth 60 per the aspect shown in FIG. 6.

FIG. 12 illustrates the changes in profile discussed in this aspect from a different view. Also shown in FIG. 12 is a distance 67 measured between first surface 62 and second surface 63. This distance 67 is measured in the gear tooth thickness direction between two points 67a and 67b found on first surface 62 and second surface 63, respectively, that may be connected with a straight line that runs in the gear tooth thickness direction. In aspects of gear tooth 60 such as those shown in FIGS. 10-12, distance 67 that is measured at a constant height position on gear tooth 60 changes in the gear thickness direction (i.e., in the vertical direction in FIGS. 10 and 11). Thus, points 67a and 67b are kept at a constant (selected) height as distance 67 is measured at different locations in the gear thickness direction. For example, distance 67 measured near the top and bottom of the aspect of gear tooth 60 shown in FIG. 11 will be less than distance 67 measured near the center of gear tooth 60, assuming the height of distance 67 is maintained for all three measurements.

The modifications to gear tooth 60 discussed above may be applied to any of the gears found in a planetary gear device. For example, these modifications may be applied to planetary gear 20, sun gear 30, or internal gear 4. Furthermore, the modifications may be applied to more than one of these gears. For example, aspects of gear tooth 60 discussed above may be employed on both planetary gear 20 and sun gear 30. In other aspects, only a single gear (e.g., planetary gear 20) in planetary gear device may contain modified gear teeth 60.

The aspects of gear tooth 60 discussed above may be employed across the gears in different combinations. For example, the aspect of gear tooth 60 shown in FIG. 8 may be employed on planetary gear 20, while the aspect of gear tooth 60 shown in FIGS. 11 and 12 may be employed on sun gear 30. In some aspects, gear tooth 60 may contain both a profile modification and a thickness modification. Thus, for example, a single gear tooth 60 may include profile modifications 64 as shown in FIG. 9 and may have a varying profile as shown in FIGS. 11 and 12.

Some examples of aspects of planetary gear device with gear teeth 60 according to aspects discussed above may include the following. A planetary gear device including planetary gear 20 with profile modifications 64 as shown, for example, in FIGS. 7-9. In this aspect, sun gear 30 and internal gear 4 do not have modified gear teeth 60. Another aspect of a planetary gear device includes planetary gear 20 with profile size modifications as shown in FIGS. 10-12. In this aspect, sun gear 30 and internal gear 4 do not have modified gear teeth 60. Another aspect of a planetary gear device including sun gear 30 with profile modifications 64 as shown, for example, in FIGS. 7-9. In this aspect, planetary gear 20 and internal gear 4 do not have modified gear teeth 60. Another aspect of a planetary gear device includes sun gear 30 with profile size modifications as shown in FIGS. 10-12. In this aspect, planetary gear 20 and internal gear 4 do not have modified gear teeth 60. These aspects are intended as examples only as other variations of planetary gear device may be conceived by, for example, combining the features of these aspects.

The aspects of planetary gear 20 with profile modifications 64 discussed above may provide specific additional benefits for aspects of carrier 10 that include multiple portions as discussed with respect to FIG. 3. As discussed above, carrier 10 of FIG. 3 allows for improved assembly efficiency. However, joining multiple portions to form carrier 10 may result in increased tolerances, which may result in less precise meshing of the various gears in aspects of planetary gear device that use multi-part carrier 10. This may result in increased gear noise, reduced gear efficiency, and increased wear. However, implementing one or more of profile modifications 64 improves gear tooth meshing and reduces noise, and thus can reduce these effects when using multi-part carrier 10. Thus, the improved assembly efficiency of multi-part carrier 10 may be retained through the improvements created by profile modifications 64.

It is to be appreciated that the Detailed Description section, and not the Summary and Abstract sections, is intended to be used to interpret the claims. The Summary and Abstract sections may set forth one or more but not all exemplary aspects of the present disclosure as contemplated by the inventor(s), and thus, are not intended to limit the present disclosure and the appended claims in any way.

The foregoing description of the specific aspects will so fully reveal the general nature of the disclosure that others can, by applying knowledge within the skill of the art, readily modify and/or adapt for various applications such specific aspects, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary aspects, but should be defined only in accordance with the following claims and their equivalents.

What is claimed is:

1. A gear tooth for a gear of a planetary gear device, comprising:
   a tip surface that is formed at an outer extension of the gear tooth in a radial direction;
   a first surface that extends from an outer surface of a gear body towards the tip surface;
   a second surface that extends from the outer surface of the gear body towards the tip surface; and
   a profile modification that extends between the tip surface and at least one of the first surface or the second surface such that the profile modification joins the tip surface and the at least one of the first surface or the second surface, wherein the profile modification comprises a first planar surface that intersects the tip surface and the first surface, wherein the profile modification comprises a second planar surface that intersects the tip surface and the second surface, and wherein the first planar surface and the second planar surface extend the same distance between their intersections with the tip surface and the first surface and second surface, respectively.

2. A gear for a planetary gear device, comprising one or more of the gear tooth according to claim 1.

3. A planetary gear device, comprising
a gear housing;
an internal gear fixed to, and disposed inside, the gear housing;
a carrier rotatably mounted inside the gear housing;
a planetary gear rotatably mounted in the carrier on a planetary gear shaft, wherein the planetary gear meshes with the internal gear; and
a sun gear disposed inside the carrier, wherein the sun gear meshes with the planetary gear;
wherein at least one of the planetary gear, sun gear, and internal gear comprise one or more of the gear tooth according to claim 1.

4. A planetary gear device, comprising
a gear housing;
an internal gear fixed to, and disposed inside, the gear housing;
a carrier rotatably mounted inside the gear housing, wherein the carrier comprises two separable portions that are joined together to form the carrier;
a planetary gear rotatably mounted in the carrier on a planetary gear shaft, wherein the planetary gear meshes with the internal gear; and
a sun gear disposed inside the carrier, wherein the sun gear meshes with the planetary gear;
wherein at least one of the planetary gear, sun gear, and internal gear comprise one or more gear teeth, comprising:
a tip surface that is formed at an outer extension of the gear tooth in a radial direction;
a first surface that extends from an outer surface of a gear body towards the tip surface; and
a second surface that extends from the outer surface of the gear body towards the tip surface,
wherein the gear tooth is formed such that a first distance, measured between a first point on the first surface and a corresponding first point on the second surface at a constant gear tooth height, is not constant in a gear thickness direction extending between an upper surface and a lower surface of the gear body.

5. The planetary gear device of claim 4, wherein the sun gear comprises the one or more gear teeth, and
wherein the planetary gear comprises one or more of a second gear tooth, comprising:
a tip surface that is formed at an outer extension of the second gear tooth in a radial direction;
a first surface that extends from an outer surface of a gear body towards the tip surface;
a second surface that extends from the outer surface of the gear body towards the tip surface; and
a profile modification that extends between the tip surface and at least one of the first surface or the second surface such that the profile modification joins the tip surface and the at least one of the first surface or the second surface.

6. The planetary gear device of claim 4, wherein the planetary gear comprises the one or more gear teeth, and
wherein the sun gear further comprises one or more of a second gear tooth, comprising:
a tip surface that is formed at an outer extension of the second gear tooth in a radial direction;
a first surface that extends from an outer surface of a gear body towards the tip surface;
a second surface that extends from the outer surface of the gear body towards the tip surface; and
a profile modification that extends between the tip surface and at least one of the first surface or the second surface such that the profile modification joins the tip surface and the at least one of the first surface or the second surface.

7. The planetary gear device of claim 4, wherein a second distance, measured between a second point on the first surface and a corresponding second point on the second surface at the constant gear tooth height, is less than the first distance,
wherein the second distance is taken in a portion of the gear tooth located closer to either the upper surface of the gear or the lower surface of the gear than a portion of the gear tooth containing the first distance.

8. The planetary gear device of claim 7, wherein a third distance is measured between a third point on the first surface and a third point on the second surface at the constant gear tooth height,
wherein the portion of the gear tooth containing the second distance is closer to the upper surface than the portion of the gear tooth containing the first distance,
wherein the portion of the gear tooth containing the third distance is closer to the lower surface than the portion of the gear tooth containing the first distance, and
wherein the first distance is greater than the second distance and the third distance.

9. The planetary gear device of claim 8, wherein the first point on the first surface and the corresponding first point on the second surface are located at the intersection between the first surface and the second surface, respectively, with the tip surface, and
wherein the first distance is constant in the gear thickness direction.

* * * * *